United States Patent [19]

Hiramatsu

[11] Patent Number: 5,316,233
[45] Date of Patent: May 31, 1994

[54] SEAT BELT RETRACTOR WITH SPRINGS CONNECTED IN SERIES AND MOTORIZED SPRING FORCE ADJUSTMENT

[75] Inventor: Koji Hiramatsu, Shiga, Japan
[73] Assignee: Takata Corporation, Tokyo, Japan
[21] Appl. No.: 912,754
[22] Filed: Jul. 13, 1992

[30] Foreign Application Priority Data

Jul. 19, 1991 [JP] Japan ................. 3-179368

[51] Int. Cl.⁵ .................. B60R 22/44; B60R 22/46; B65H 75/48
[52] U.S. Cl. ................... 242/107; 242/107.5
[58] Field of Search ............ 242/107.5, 107, 107.4 R; 280/801, 806; 297/475, 478

[56] References Cited

U.S. PATENT DOCUMENTS

| | | | |
|---|---|---|---|
| 4,162,772 | 7/1979 | Shimogawa et al. | 242/107 |
| 4,478,433 | 10/1984 | Taguchi et al. | 242/107 X |
| 4,579,294 | 4/1986 | Sakakibara et al. | 242/107 |
| 4,640,472 | 2/1987 | Epple | 242/107.5 X |
| 4,809,925 | 3/1989 | Takada | 242/107 |

FOREIGN PATENT DOCUMENTS 57-20212 4/1982 Japan .

*Primary Examiner*—Daniel P. Stodola
*Assistant Examiner*—John Rollins
*Attorney, Agent, or Firm*—Kanesaka and Takeuchi

[57] ABSTRACT

A seat belt retractor is formed of a frame having a pair of side plates which face each other and having a back plate which interconnects the side plates, a reel shaft rotatably mounted between the side plates and having both ends projecting to exterior areas of the side plates, power springs linked in series for energizing the reel shaft in a direction of retracting a seat belt. The power springs have different spring constants. The retractor has a force adjusting device for enlarging force of retracting the seat belt by taking up the power spring having a small spring constant and for weakening the force by releasing the power spring of the small spring.

6 Claims, 17 Drawing Sheets

SEAT BELT RETRACTOR WITH SPRINGS CONNECTED IN SERIES AND MOTORIZED SPRING FORCE ADJUSTMENT

BACKGROUND OF THE INVENTION

1. Field of the Invention

The present invention relates to a seat belt retractor for vehicles to protect an occupant and more particularly to a seat belt retractor in which a seat belt thereof is in contact with the occupant with light pressure while it is fastened and it is retracted strongly when it is retracted into the retractor.

2. Description of the Related Art

As is commonly known, a seat belt retractor is designed to restrain an occupant by unwinding a seat belt from a retractor provided in a vehicle and engaging a tongue of the seat belt into a buckle.

In the seat belt retractor, the seat belt withdrawn from the retractor has usually tension from the retractor in the retracting direction thus enabling the seat belt to fit the occupant.

However, because the seat belt is in constant contact with the occupant, when the tension of the belt is too large, the seat belt restrains the occupant too strong so that the occupant feels uncomfortable. On the contrary, when the tension of the belt is too weak, the retractor retracts the seat belt slowly.

To solve these problems, Japanese Utility Model Publication No. 57-20212 proposes a seat belt retractor which comprises a rotatable spring case connected to a seat belt retracting reel shaft through a helical spring, and an externally operable adjusting gear engaging with gear teeth formed in an outer surface of the spring case so as to enable to adjust retracting force of the helical spring.

However, the seat belt retractor disclosed in Japanese Utility Model Publication No. 57-20212 has the reel shaft energized by a single power spring, so that energizing or spring force of the retractor is adjusted solely by this single power spring. Therefore, a range of adjusting the retracting force for the seat belt is relatively narrow. As a result, the seat belt retractor of the Utility Model can not substantially meet the following contradictory requirements: Namely, eliminating restrained feeling of the occupant while wearing the seat belt and enlarging the retracting force of the seat belt.

SUMMARY OF THE INVENTION

It is an object of the present invention to provide a seat belt retractor in which force for retracting a seat belt is applied to a reel shaft through a serial connection of power springs having different spring constants, and the force is adjusted by partially winding the power springs. Accordingly, the seat belt retractor can not only retract the seat belt swiftly with full use of power, but also enables the seat belt to fit an occupant with light pressure.

Another object of the present invention is to provide a seat belt retractor in which two kinds of power springs act to transmit a force through spur gears, thus enabling reliable transmission of force between the power springs.

A further object of the present invention is to provide a seat belt retractor in which a rotary member on a side of the reel shaft is connected with a rotary member of a driving device of a retracting force adjuster through a tape. Then, a center distance between axes of the two rotary members is freely adjustable to provide a greater degree of freedom in designing the seat belt retractor.

A seat belt retractor in a first aspect of the present invention comprises: a frame having a pair of side plates which face each other, and having a back plate which interconnects the side plates; a reel shaft between the side plates of the frame which has an end projecting beyond the side plates; power springs in a serial connection provided outside the side plate, one end portion of the connected power springs being connected to one end portion of the reel shaft so as to energize the reel shaft in a belt-retracting direction; and a retracting force adjusting device for adjusting retracting force by partially taking up the power springs which is connected to the other end portion of the serial power springs. The power springs include at least first and second power springs which have different spring constants.

In a seat belt retractor of a second aspect of the invention, the retracting force adjusting device as defined in the first aspect comprises a shaft actuator member mounted coaxially on the reel shaft, a first spur gear mounted coaxially on the shaft actuator member, a second spur gear pivotally supported by the side plate and mating with the first spur gear, a rotary drive shaft mounted coaxially on the second spur gear, and a drive unit for rotating the rotary drive shaft. The first power spring is wound up on the shaft actuator member. An inner circumferential end portion of the first power spring is connected to the shaft actuator member. An outer circumferential end portion of the first power spring is connected to the first spur gear. The second power spring is wound up on the rotary drive shaft. An inner circumferential end portion of the second power spring is connected to the rotary drive shaft. An outer circumferential end portion of the second power spring is connected to the second spur gear.

In a seat belt retractor in a third aspect of the invention, the retracting force adjusting device as defined in the first aspect comprises: the shaft actuator member mounted coaxially on the reel shaft; a first rotary member rotatably fitted into the shaft actuator member, and having a tape taking-up portion; a second rotary member rotatably fitted into the shaft actuator member; a third rotary member for taking up the tape, and having a rotation axis parallel to the shaft actuator member; a drive unit for rotating the third rotary member; and a tape for transmitting rotary force, one end portion of the tape being wound onto the first rotary member and the other end portion being wound onto the third rotary member. The first and second power springs are wound on the shaft actuator member. An outer circumferential end portion of the first power spring is connected to the first rotary member. An inner circumferential end portion of the first spring is wound on the second rotary member; and likewise. An outer circumferential end portion of the second power spring is connected to the second rotary member. An inner circumferential end portion of the second power spring is connected to the shaft actuator member.

In the seat belt retractor of the present invention, the power springs consist of a plurality of power springs linked in series and having different spring constants. Accordingly, when the retracting force adjusting device is partially taking up the power springs linked in series, one power spring having a spring constant smaller than the other is selectively taken up first by the retracting force adjusting device, so that the shaft energizing force generated by the power springs become large. As a result, the seat belt retractor can successfully retract the seat belt swiftly and with full use of the power.

On the other hand, when the power spring, which has been taken up by the retracting force adjusting device, having a small spring constant is unwound, the total spring constant of the power springs becomes small, thus, the take-up force exerted on the reel shaft turns out to be substantially small. As a result, the seat belt fits the occupant with applying a slight pressure and the occupant's feeling of oppression is removed.

In the seat belt retractor of the second aspect, the first and the second power springs are linked through the spur gears, thus providing a very effective transmission of force between the both power springs.

In the seat belt retractor of the third aspect, the first rotary member of the shaft actuator member and the third rotary member of the drive unit are linked through the tape. Accordingly, a center distance between the axes of the first and the second rotation members can be freely determined.

DESCRIPTION OF THE PREFERRED EMBODIMENTS

A detailed description of preferred embodiments of the present invention will now be given in conjunction with the accompanying drawings.

Figure 1:
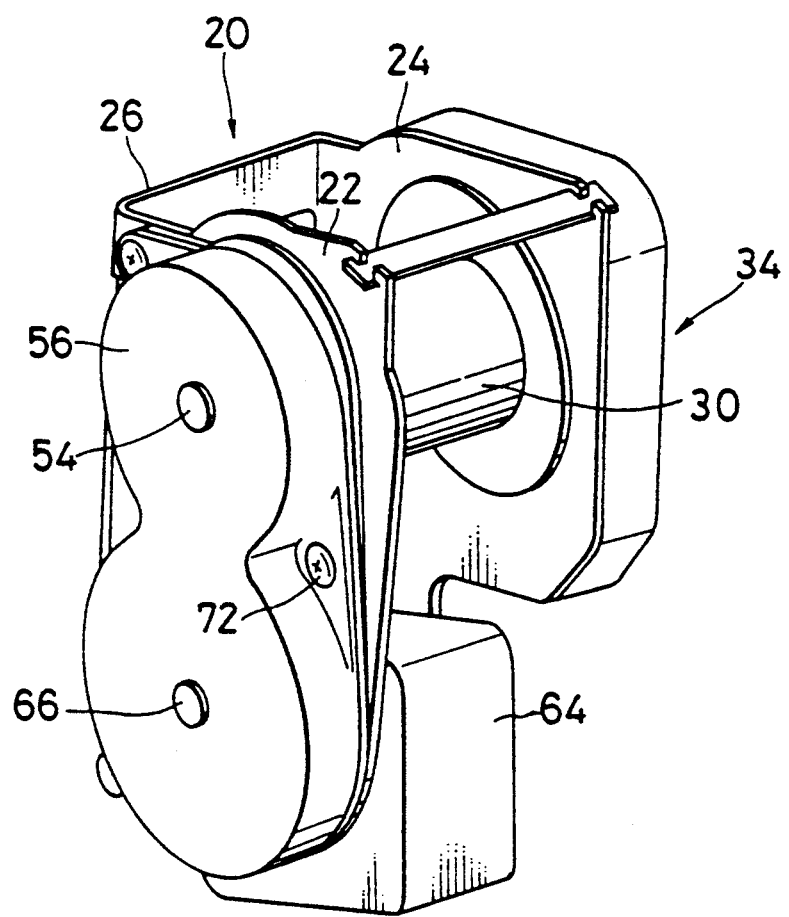
FIG. 1 is a perspective view of one embodiment of a seat belt retractor according to the present invention.
Figure 2:
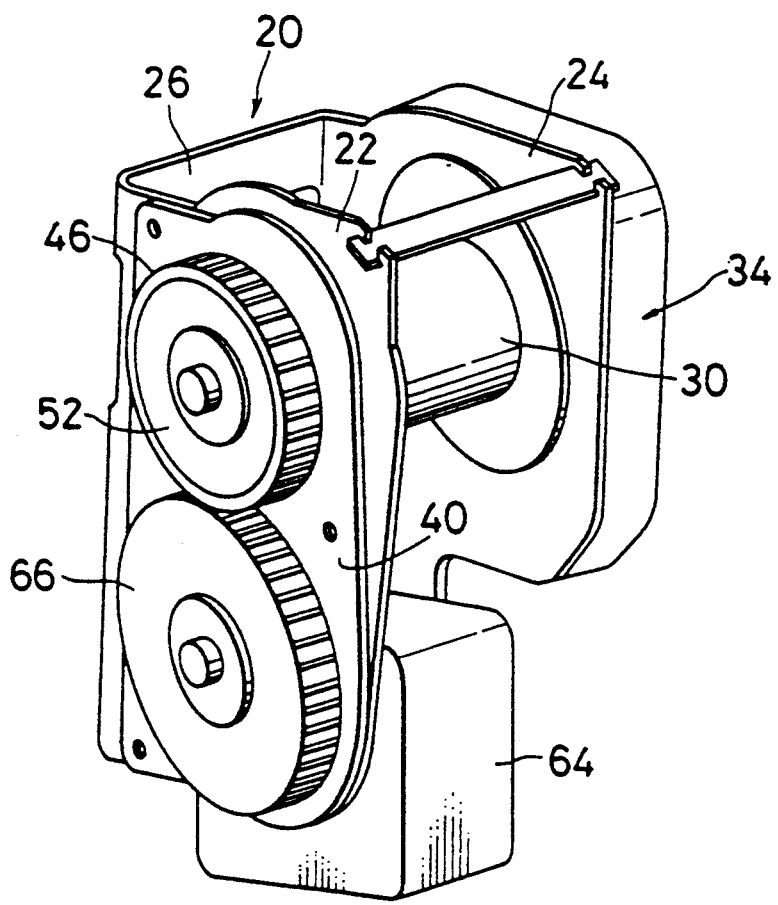
FIG. 2 is a perspective view illustrating the seat belt retractor shown in FIG. 1 in an uncovered state.
Figure 3:
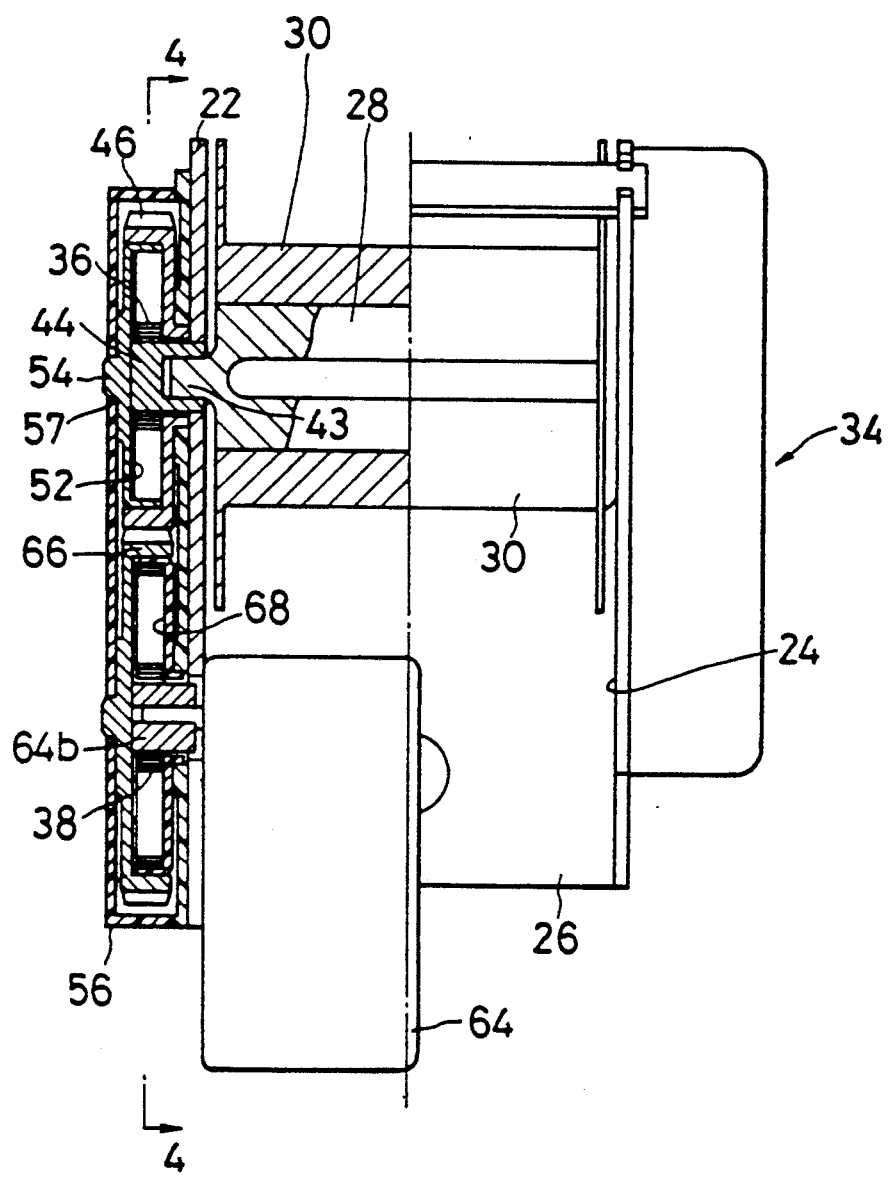
FIG. 3 is an elevational view combined with a left-half sectional view of the seat belt retractor shown in FIGS. 1 and 2.
Figure 4:
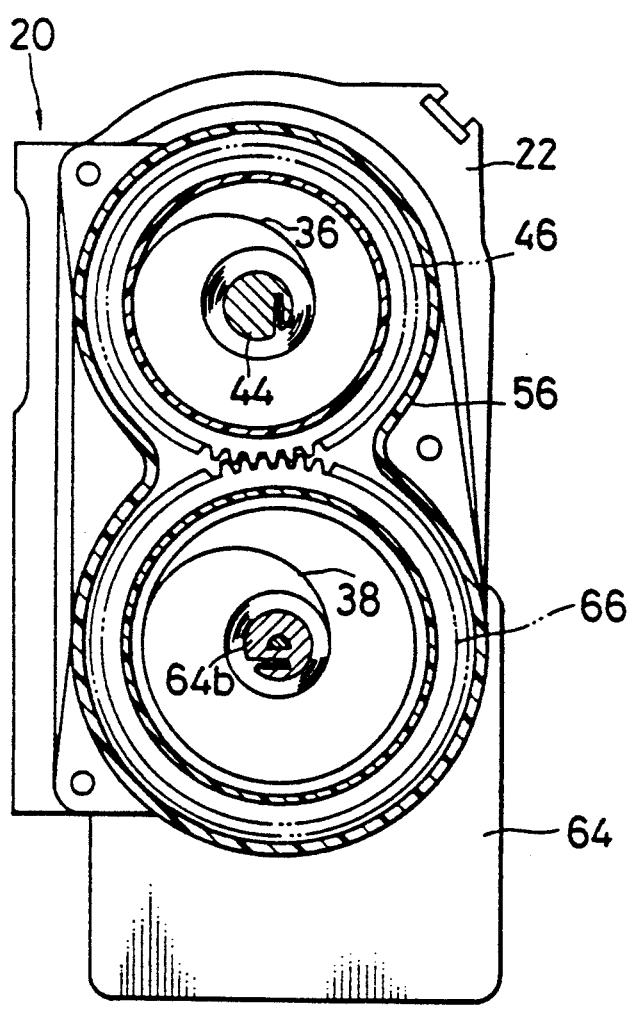
FIG. 4 is a sectional view generally taken along the line 4—4 of FIG. 3.
Figure 5:
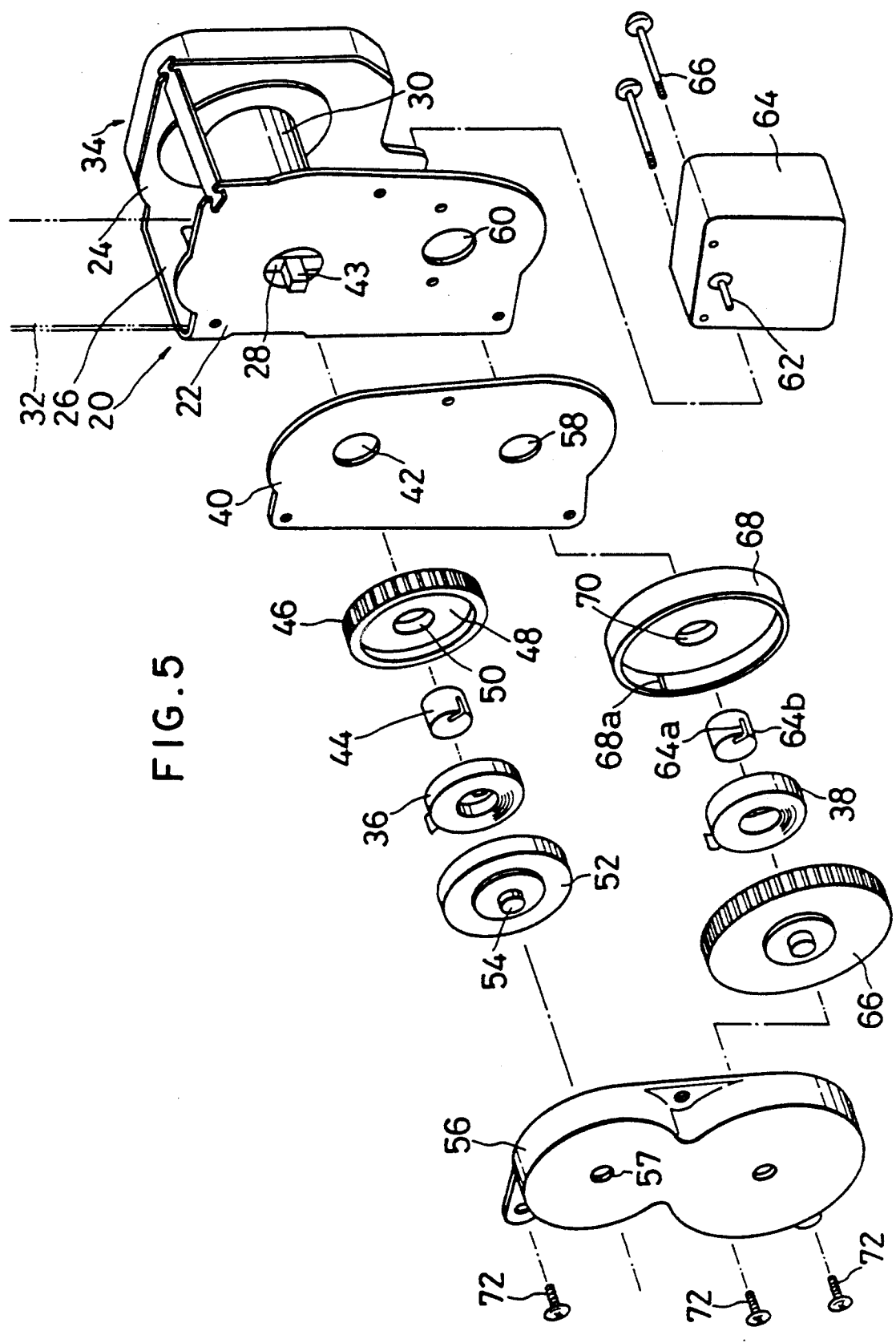
FIG. 5 is an exploded perspective view of the seat belt retractor shown in FIGS. 1-4.
Figure 16:
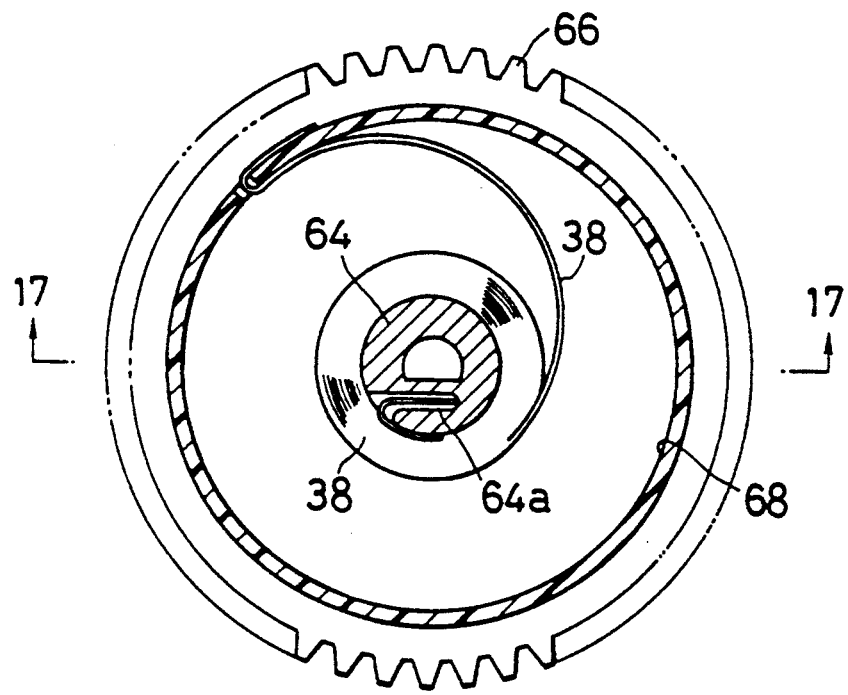
FIG. 16 is a sectional view of a power spring and spur gear.
Figure 17:
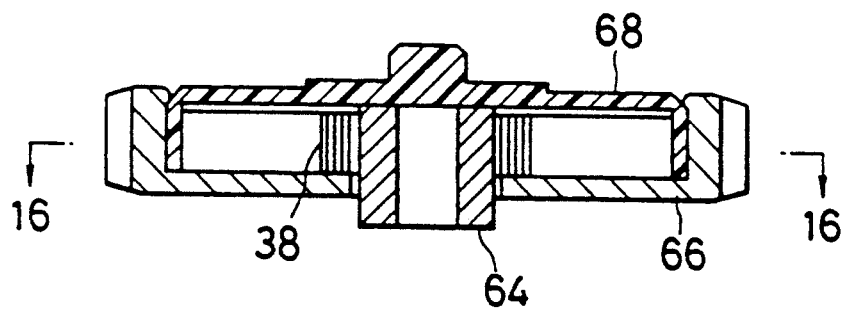
FIG. 17 is a sectional view generally taken along the line 17—17 of FIG. 16.
Figure 18:
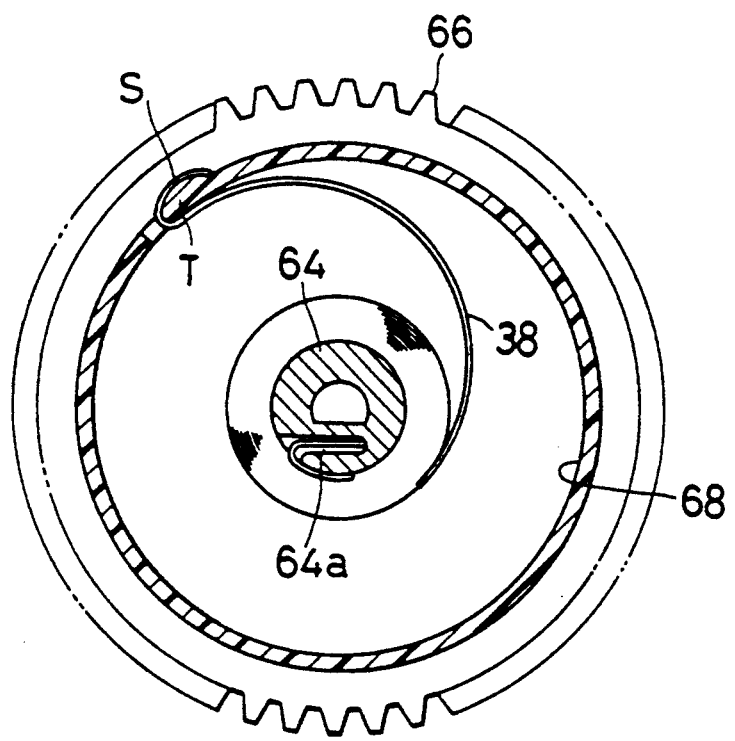
FIG. 18 is a sectional view of an alternative power spring and spur gear.

FIG. 1 is a perspective view of one embodiment of a seat belt retractor according to the present invention. FIG. 2 is a perspective view of an uncovered take-up force adjusting device of the seat belt retractor. FIG. 3 is an elevational view combined with a left-half sectional view of the seat belt retractor shown in FIGS. 1 and 2. FIG. 4 is a sectional view generally taken along the line 4—4 of FIG. 3. FIG. 5 is an exploded perspective view of the seat belt retractor shown in FIGS. 1-4. FIG. 16 and FIG. 17 are sectional views illustrating the configuration of a spur gear.

A frame 20 comprises a pair of side plates 22,24 which face each other and a back plate 26 which interconnects the side plates 22,24 together. A reel shaft 28 is mounted between the side plates 22,24 in such a manner that both ends of the reel shaft 28 project therefrom. A reel column 30 is so mounted on the outer circumferential surface of the reel shaft 28 that a seat belt 32 is taken up by the reel column 30.

On an outside area of the side plate 24, there is provided a locking device 34 which is designed to stop a rotation of the reel column 30 in an emergency situation such as a vehicle collision or some other reason to prevent the seat belt from being abruptly unwound.

On an outside area of the side plate 22, a power spring unit for energizing the reel shaft 28 in the direction to take is taken up the seat belt 32 is taken up and an adjusting device for adjusting the winding force of the power spring are provided. According to the above embodiment of the present invention, the power spring unit consists of two spring members, a first power spring 36 and a second power spring 38. A spring constant of the second power spring 38 is greater than that of the first power spring 36.

A base plate 40 is mounted on the side plate 22 and an end portion 43 of the reel shaft 28 protrudes slightly from a hole 42 of the base plate 40. The end portion 43 of the reel shaft 28 has a squared-pole shape and fits a squared center hole of a shaft actuator member 44.

A first spur gear 46 and the first power spring 36 are mounted on the outer peripheral surface of the shaft actuator member 44. The first spur gear 46 has a circular recess area 48 and a center hole 50 which slidably receives the shaft actuator member 44. The first power spring 36 is accommodated within the recess area 48 of the first spur gear 46 and an end portion of the first power spring 36 at an inner circumferential area is connected to the shaft actuating member 44 and the other end portion of the power spring 36 at an outer circumferential area is secured to the first spur gear 46.

A gear case 52 fits in the recess area 48 of the spur gear 46 to cover the first power spring 36. The end portion of the first power spring 36 at the outer circumferential area is clamped between an outer circumferential surface of the gear case 52 and an inner circumferential surface of the recess area of the spur gear 46. The gear case 52 has a protruding portion 54 in its axial center area and the protrusion portion 54 is fitted in an aperture of a guard member 56.

Below the hole 42 of the base plate 40, another hole 58 is provided in the base plate 40 to be aligned with a hole 60 of the side plate 22. A motor 64 is secured to a lower area of the side plate 22 by screws 66. The motor has a rotor shaft 62 which projects through the holes 58, 60.

A rotation drive shaft member 64b is secured to the rotor shaft 62. A second spur gear 66, the second power spring 38, and a gear case 68 are provided at the outer circumferential area of the drive shaft member 64b. The second spur gear 66 engages with the first spur gear 46.

As in the first spur gear, the second spur gear 66 has a recess area in which the second power spring 38 is accommodated. And then, the gear case 68 fits in the recess area. As is shown in FIG. 16 and FIG. 17, an end portion of the second power spring 38 at the inner circumferential area is pinched and connected to a slit 64a of the drive shaft member 64b. The other end portion of the second power spring 38 at an outer circumferential area is pinched between an outer circumferential surface of the gear case 68 and an inner circumferential surface in the recess area of the spur gear 66 via a slit 68a provided in the gear case 68. The drive shaft member 64b slidably fits in a center hole 70 of the gear case 68 and thus the second spur gear 66 can rotate about the drive shaft member 64b. Screws 72 are provided to secure the guard member 56 to the side plate 22 together with the base plate 40 therebetween.

In the seat belt retractor with the above configuration, the reel shaft 28 and the reel column 30 are energized in the direction of retracting the seat belt 32 by means of the first power spring 36 and the second power spring 38. In this situation, when the second power spring 38 is taken up by actuating the motor 64 around the outer circumference of the drive shaft member 64b, an energizing force produced by the power springs 36 and 38 which act as a serial connecting means in the direction of retracting the seat belt 32 is relatively strengthened. When the power spring 38 is fully taken up, the reel shaft 28 is substantially energized only by the resultant force of the first power spring 36, thus enabling the reel column 30 to retract the seat belt 32 with the maximum amount of power. Accordingly, when an occupant disengages a tongue from a buckle, the seat belt can be taken up swiftly with the maximum amount of power.

When the second power spring 38 is unwound from the drive shaft member 64b by actuating the motor 64, the energizing force of the reel shaft 28 for taking up the seat belt 32 by the serial connecting means of the power springs 36 and 38 is weakened and thus the seat belt 32 tends to be wound onto the reel column 30 with a considerably light force. Accordingly, under this circumstance, the seat belt contacts the body of the occupant with a light pressure, and thus the occupant does not substantially feel a sense of pressure. As a result, the occupant is able to sit comfortably with the seat belt fastened.

In the above embodiment of the present invention, the first and the second power springs 36 and 38 are connected together through the spur gears 46 and 66, whose respective teeth engage with each other. Thus both of the power springs 36 and 38 are able to transmit spring power in a very effective manner.

Figure 6:
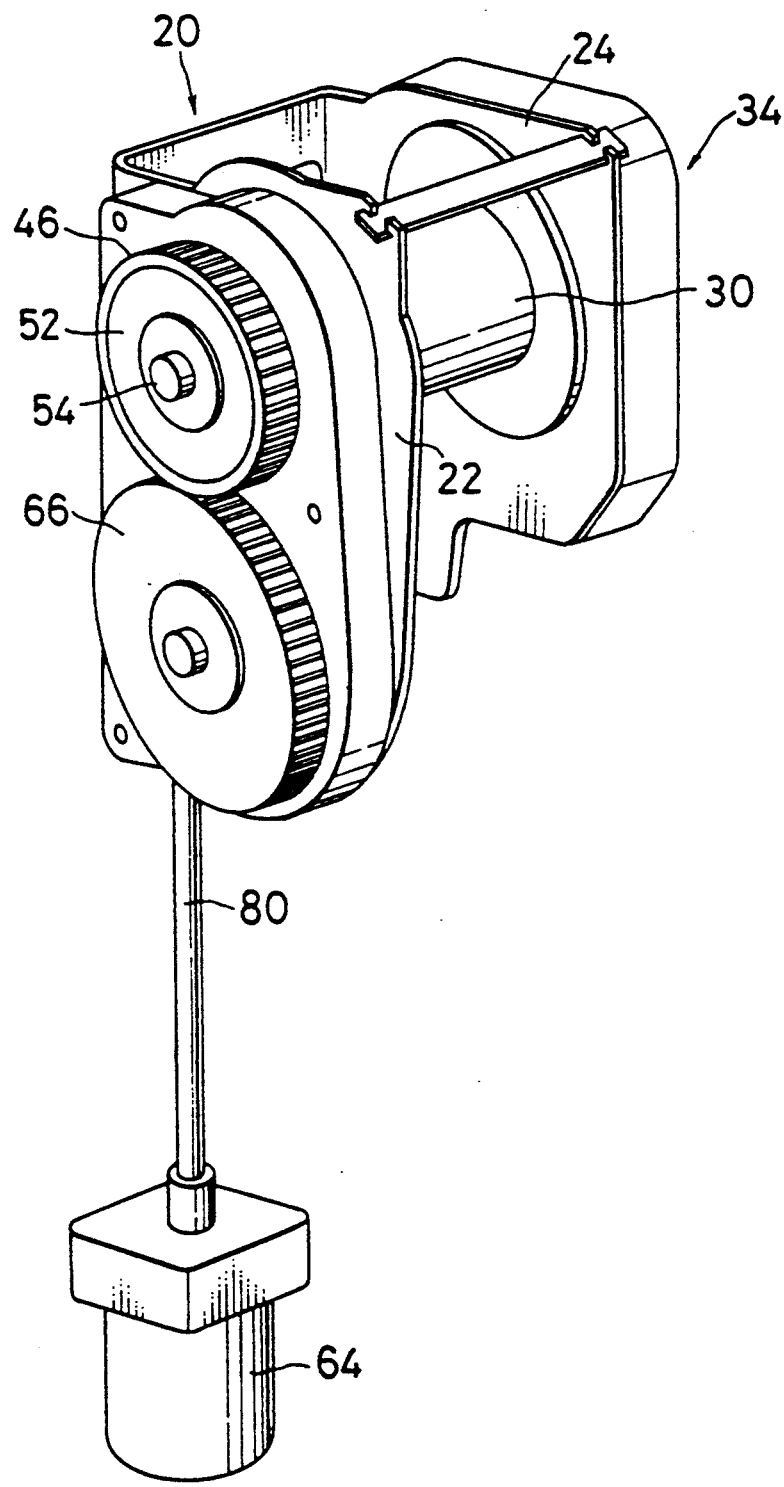
FIG. 6 is a perspective view of another embodiments of a seat belt retractor according to the present invention.
Figure 7:
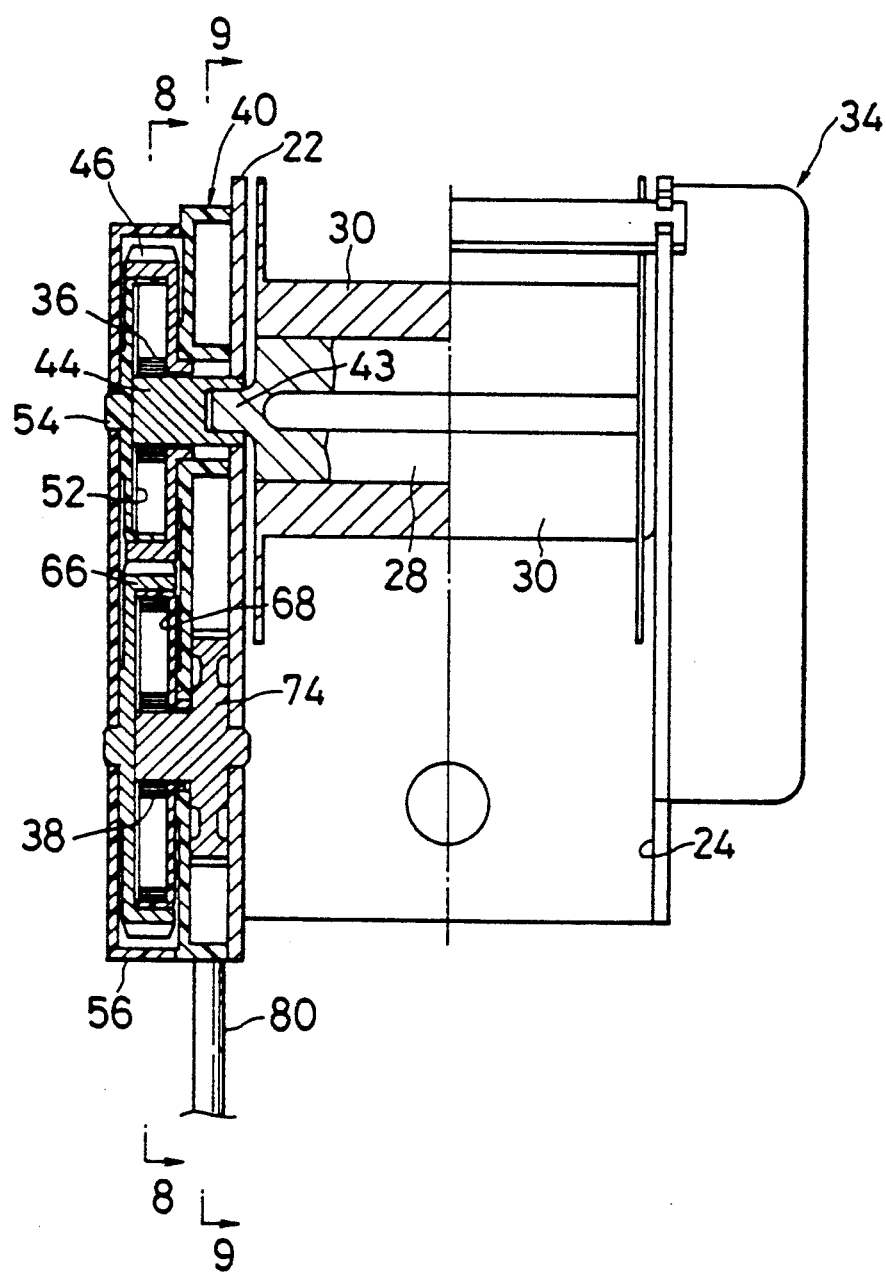
FIG. 7 is an elevational view combined with a left-half sectional view of the seat belt retractor shown in FIG. 6.
Figure 8:
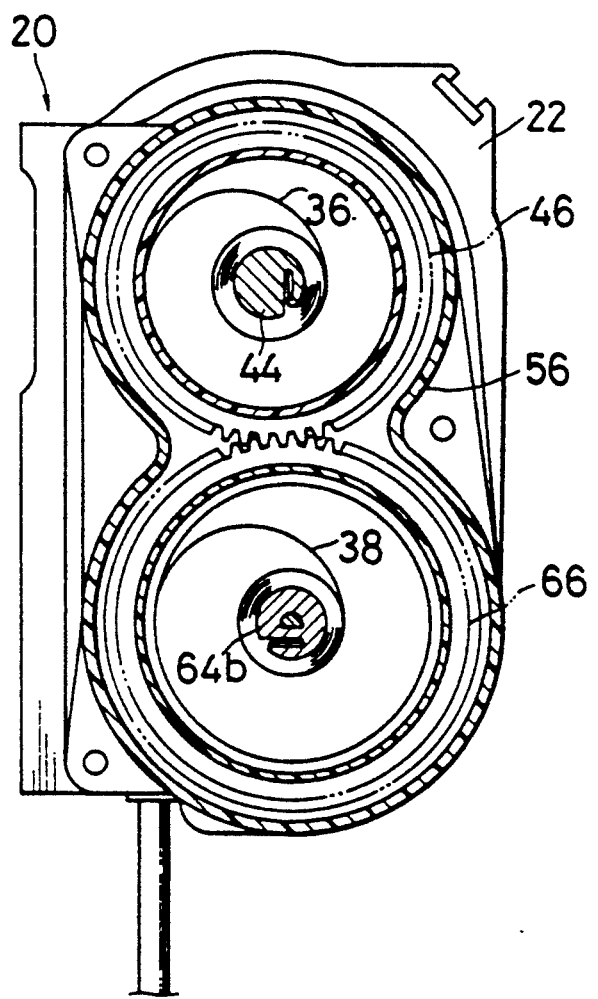
FIG. 8 is a sectional view generally taken along the line 8—8 of FIG. 7.
Figure 9:
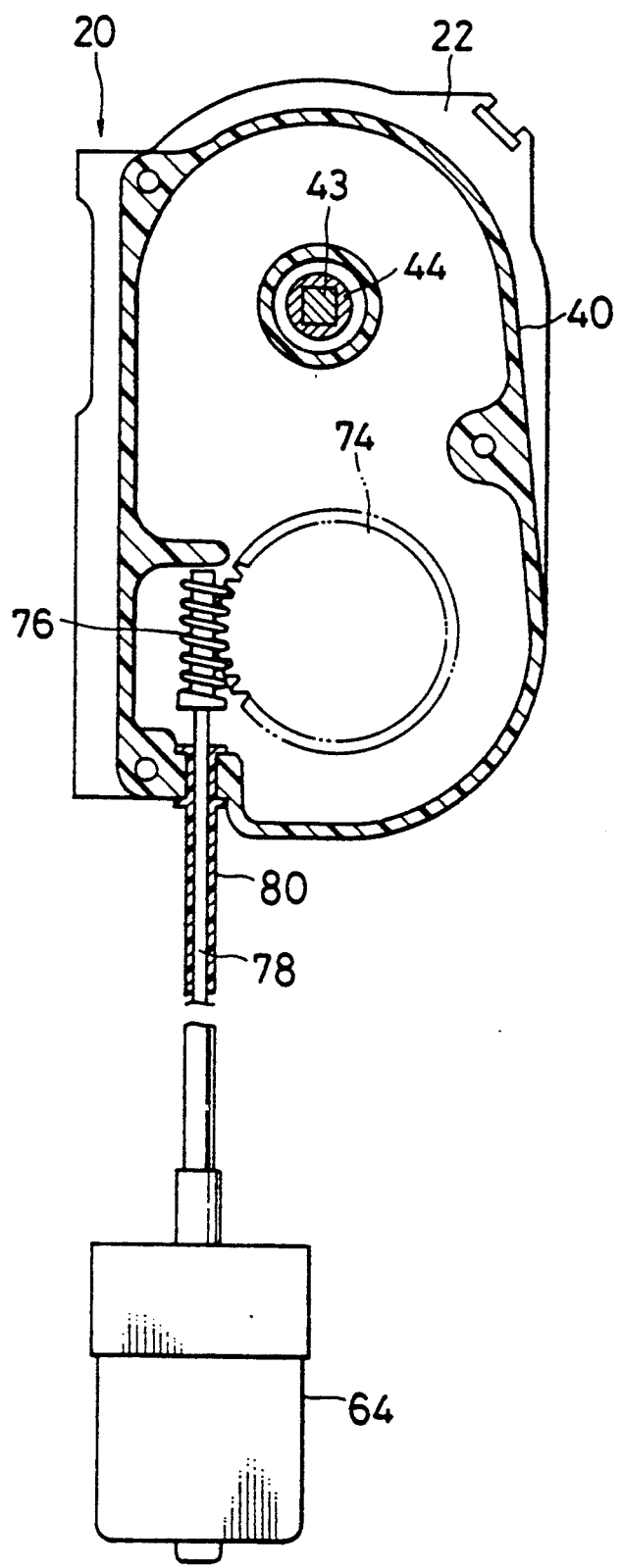
FIG. 9 is a sectional view generally taken along the line 9—9 of FIG. 7.

In the above embodiment of the invention, the motor 64 drives directly the drive shaft member 64b; however, in other embodiments of the present invention, the motor 64 can be provided separately as shown in FIG. 6 and FIG. 9. In the embodiments shown in FIGS. 6 and 9, a worm wheel 74 is associated with the drive shaft member 64b and a worm 76 meshes with the worm wheel 74. The worm 76 is rotated by the motor 64 via a motor drive shaft 78. Reference number 80 shown in FIG. 9 indicates a bearing column of the motor drive shaft 78.

Other components of the seat belt retractor shown in FIGS. 6~9 are the same as the components shown in FIGS. 1~5, wherein identical numbers indicate identical parts. In the seat belt retractor as shown in FIGS. 6~9, the motor 64 operates to wind or unwind the second power spring 38 onto and from the drive shaft member 64b, thus the energizing force to rotate the reel shaft 28 generated by the serial power springs 36 and 38 can be controlled desirably.

In the above embodiments of the invention illustrated in FIGS. 1~9, a stepping motor is employed as the motor 64 to detect the number of rotations of the drive shaft member 64a for the detection of the amount of the second power spring 38 wound on the drive shaft member 64b at its outer circumferential area.

Figure 10:
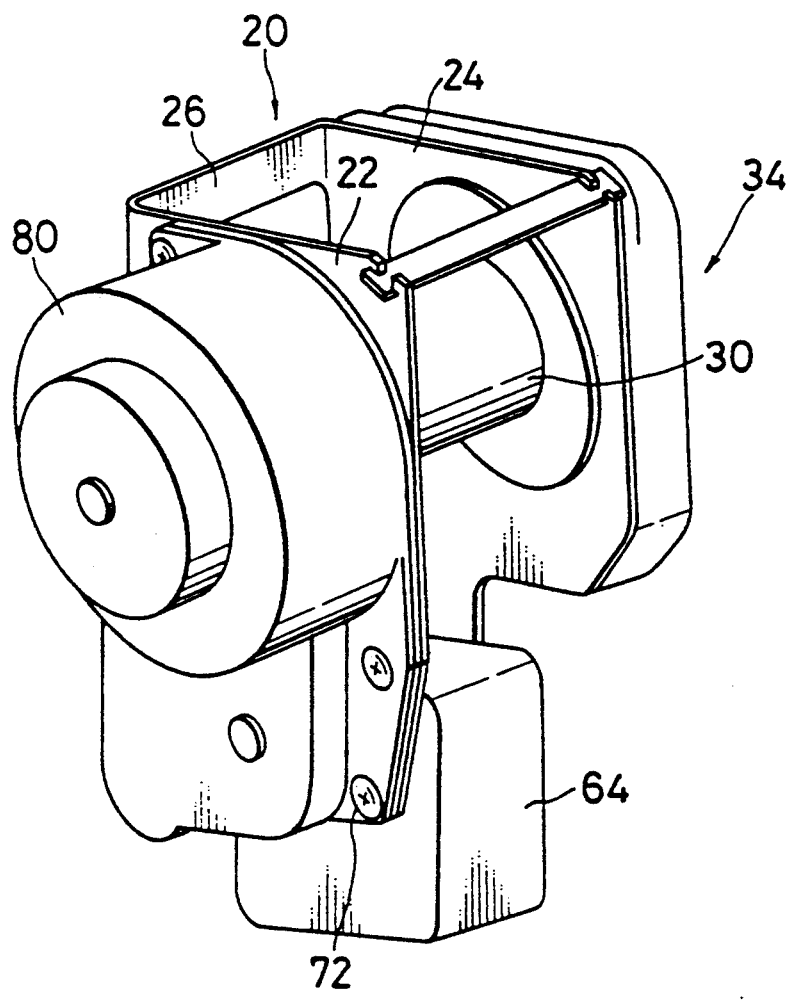
FIG. 10 is a perspective view of a further embodiment of a seat belt retractor according to the present invention.
Figure 11:
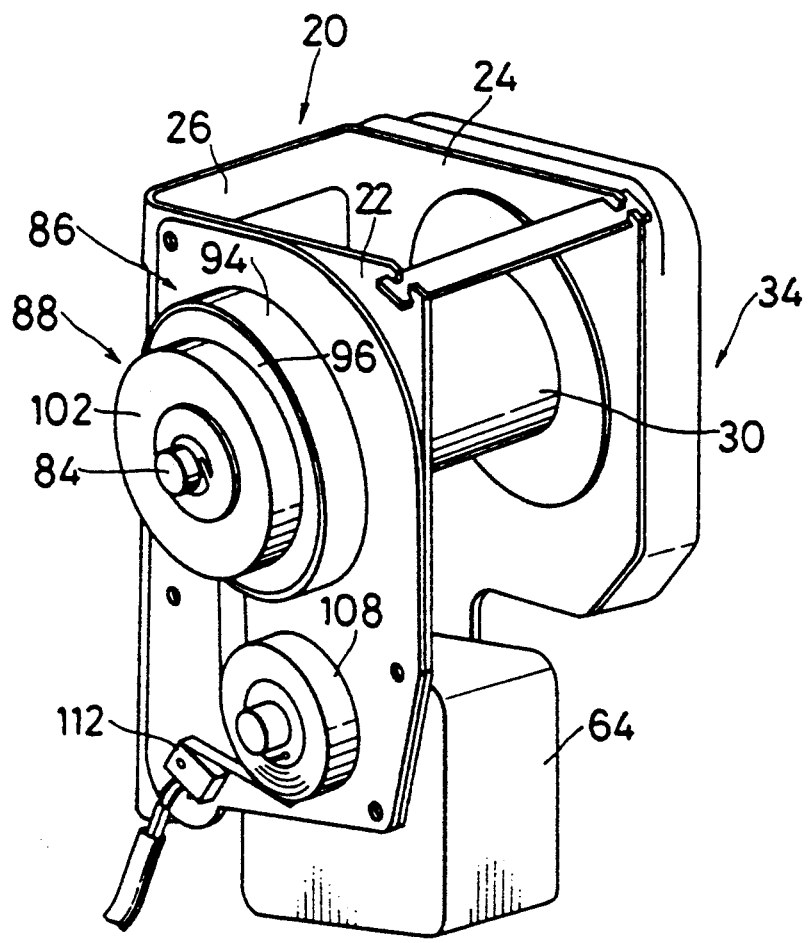
FIG. 11 is a perspective view illustrating the seat belt retractor shown in FIG. 10 in an uncovered state.
Figure 12:
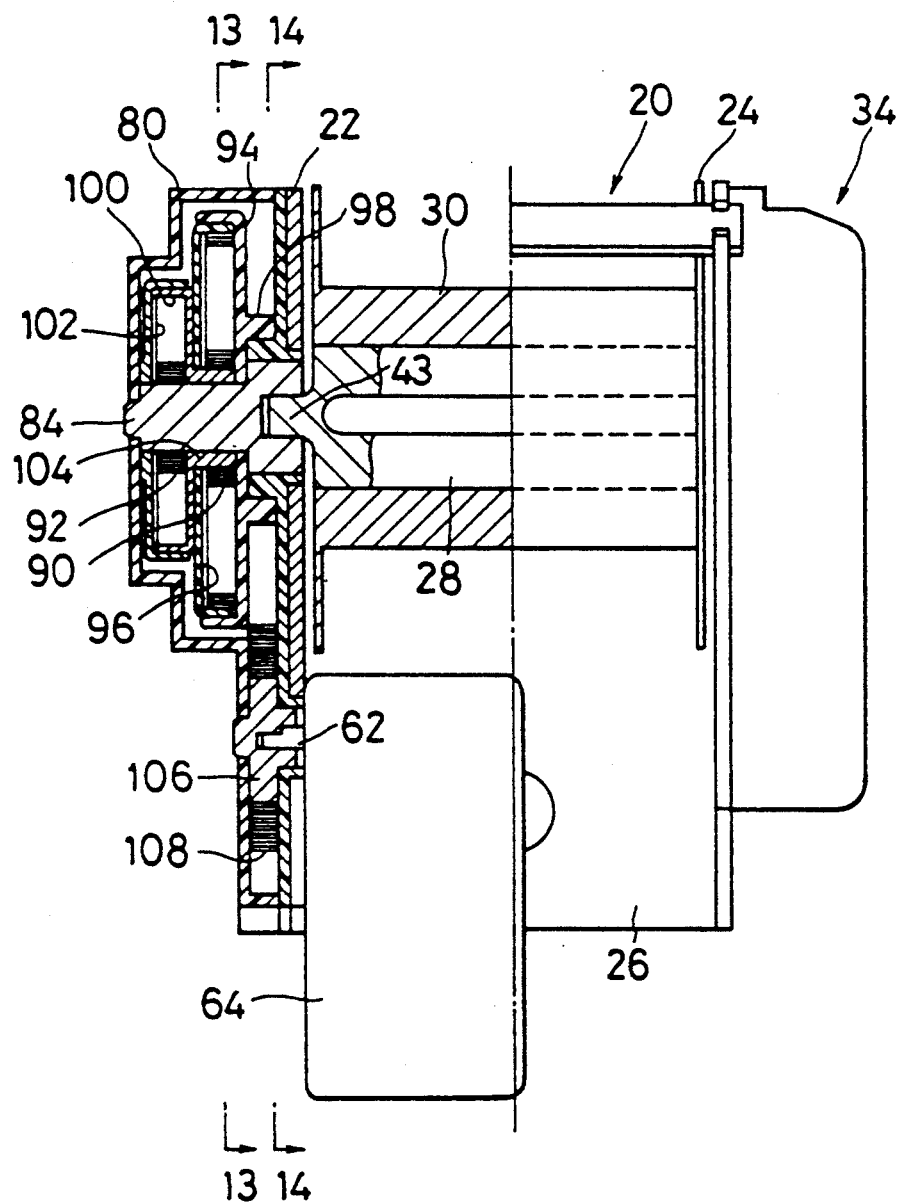
FIG. 12 is an elevational view associated with a left-half sectional view of the seat belt retractor shown in FIGS. 10 and 11.
Figure 13:
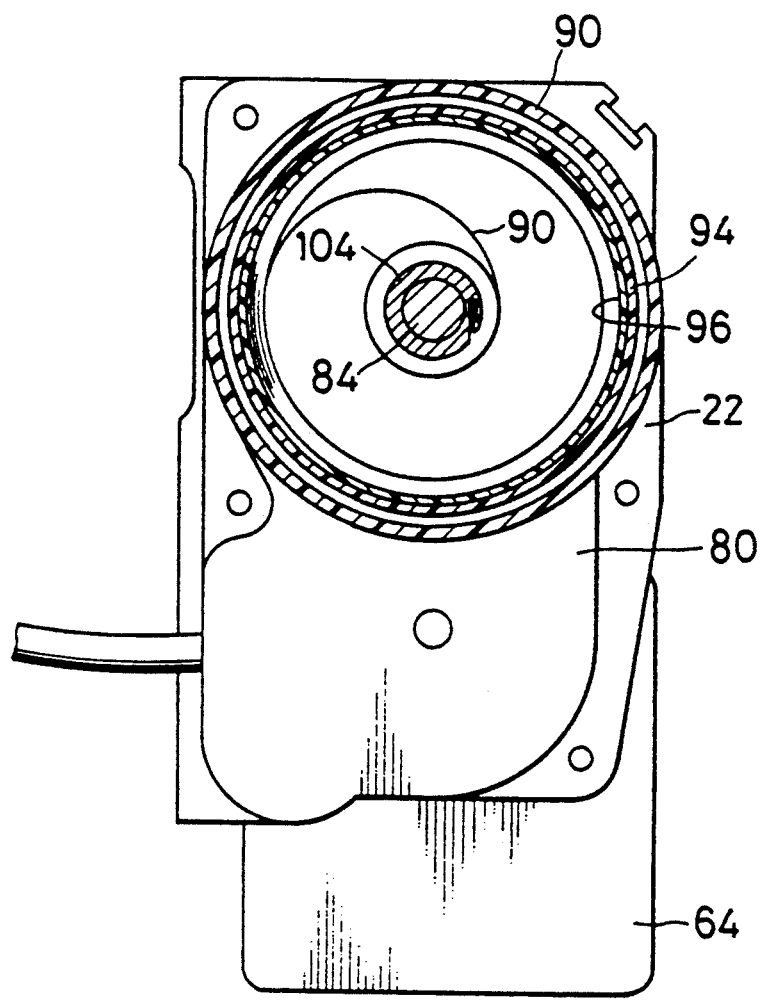
FIG. 13 is a sectional view generally taken along the line 13—13 of FIG. 12.
Figure 14:
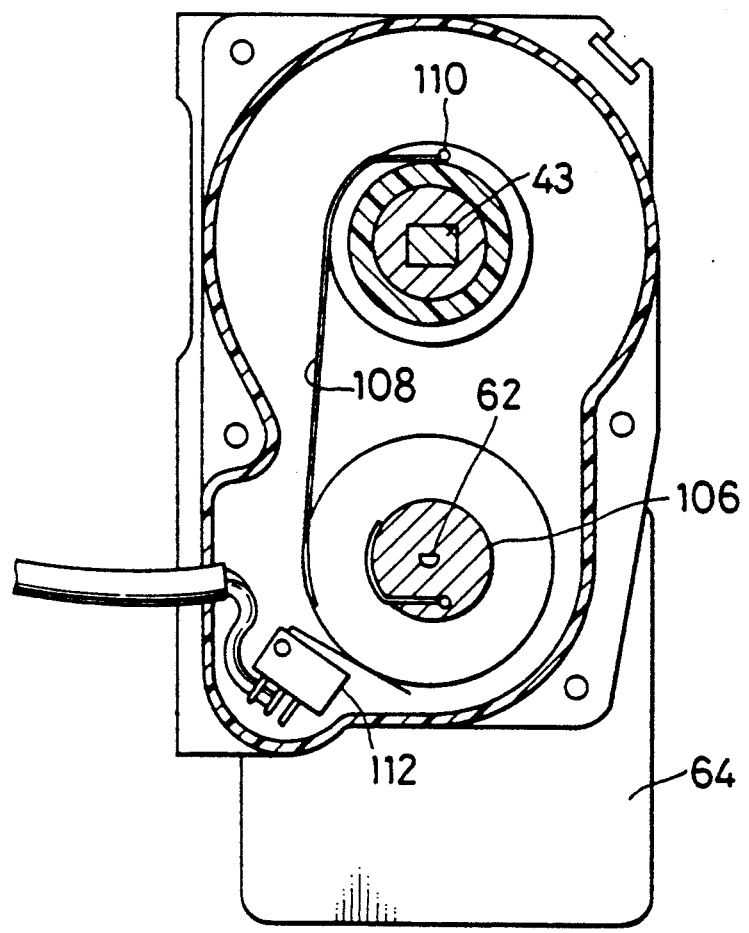
FIG. 14 is a sectional view generally take along the line 14—14 of FIG. 12.
Figure 15:
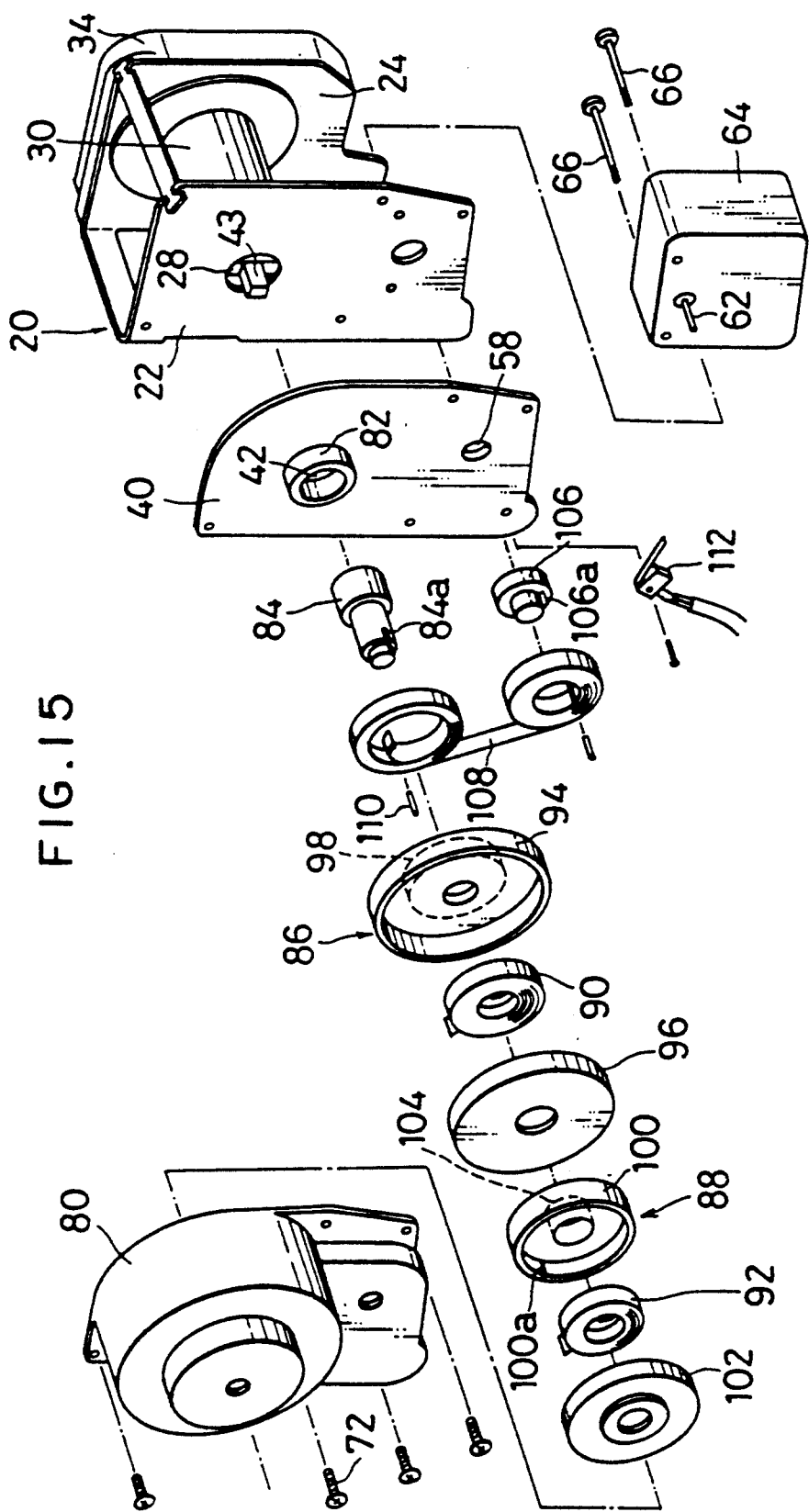
FIG. 15 is an exploded perspective view of the seat belt retractor shown in FIGS. 10-14.

FIGS. 10~15 shows a further embodiment of the seat belt retractor according to the present invention. FIG. 10 is a perspective view of the seat belt retractor. FIG. 11 is a perspective view of the seat belt retractor without a guard member 80. FIG. 12 is an elevational view combined with a left-half sectional view of the seat belt retractor. FIG. 13 and FIG. 14 are sectional views generally taken along the line 13—13 and the line 14—14 respectively of FIG. 12. FIG. 15 is an exploded perspective view of the seat belt retractor.

In this embodiment, a cylindrical projection part 82 is provided around the hole 42 of the base plate 40 mounted on the side plate 22 of the frame 20. A shaft actuator member 84 rotatably fits in an inner hole of the projection part 82 and the end portion 43 of the reel shaft 28 fits in the shaft actuator member 84. In the outer circumferential area of the shaft actuator member 84, a first rotating member 86, a second rotating member 88, a first power spring 90, and the second power spring 92 are provided.

The first rotating member 86 includes a pair of hollow disc-like spring cases 94 and 96 which are fitted in each other to accommodate the first power spring 90 therebetween. A tape take-up portion 98 of a small disc-shape projects from the outer surface of the spring case 94.

The second rotating member 88 forming a disk-shape includes a pair of hollow spring cases 100 and 102 which are fitted in each other to accommodate the second power spring 92 therebetween. At the outer surface of the spring case 100, a projecting portion 104 is provided and on the outer circumferential area of the projection portion 104 the first power spring 90 is wound. The projecting portion 104 is inserted into the first rotating member 86 via a center hole of the spring case 96.

An end portion of the first power spring 90 at the inner circumferential area is inserted into a slit provided at the outer circumferential surface of the projecting portion 104 and then connected with the second rotating member (the spring case 100). The other end portion of the first power spring 90 at the outer circumferential area is secured to the first rotating member 86 by being pinched between the spring cases 94 and 96 via a slit provided in the spring case 96.

An end portion of the second power spring 92 at the inner circumferential area is connected with the shaft actuator member 84 by being retained in a slit 84a provided in the shaft actuator member 84. The other end portion of the second power spring 92 at the outer circumferential area is secured to the second rotating member 88 by being pinched between the spring cases 100 and 102 via a slit 100a provided in the spring case 100.

A third rotating member 106 is secured to the rotor shaft 62 of the motor 64 mounted on the side plate 22 of the frame 20. An end portion of a tape 108 is connected to the third rotating member 106. The end portion of the tape 108 is secured to the rotation member 106 by being inserted into a slit 106a of the third rotating member 106. The other end portion of the tape 108 is wound onto a tape take-up portion 98 of the spring case 94 which forms one component of the first rotating member 86, and this end portion is secured to the spring case 94 by means of a pin 110. A limit switch 112 is provided to detect a diameter of the tape 108 wound around the member 106. Other configurations of this embodiment of the invention are the same as the preferred embodiments mentioned earlier, and identical numbers indicate identical parts.

In the seat belt retractor having the above described configuration shown in FIGS. 10~15, when the motor 64 rotates the third rotating member 106 and takes up the tape 108 at the outer circumferential area thereon, it becomes the same condition as when the first power spring 90 is taken-up onto the projection part 104. In this embodiment, a spring constant of the second power spring 92 is designed to be greater than that of the first power spring 90. When the first power spring 90 is taken up on the projecting portion 104 at its outer circumferential area, the reel shaft 28 can be energized only by the second power spring 92 having greater spring constant than the first power spring 90 in the taking-up direction of the seat belt, thus enabling the seat belt to be swiftly taken up with the maximum amount of power. On the other hand, when the motor 64 rotates in the reverse direction to unwind the tape 108 from the rotating shaft member 106, the coil force of the first power spring 90 is lax and the reel shaft 28 is energized by both the first and the second power springs 90 and 92 in the taking-up direction of the seat belt. Accordingly, under this circumstance, the seat belt take-up force is weak and the seat belt contacts the automobile seat occupant with a light pressure, and thus the seat occupant does not substantially feel restraint.

In this embodiment, the third rotating member 106 can be driven directly from the motor 64. A worm wheel can be provided in association with the third rotating member 106 to be rotated by a worm gear as shown in FIGS. 6~9.

In this embodiment, the limit switch 112 is provided to detect the diameter of the tape 108 taken up to the third rotating member 106. When the tape 108 is wound onto the outer circumferential area of the third rotating member 106 to the extent of a preset thickness, the limit switch 112 is actuated, which provides a signal that the first power spring 90 is sufficiently wound up. Therefore, it is possible to reliably control the force of taking up the seat belt by controlling the motor 64 in accordance with the detecting signal of the limit switch 112.

In the preferred embodiments, when the power spring is accommodated in the gear case, the end portion of the power spring at the outer circumferential area is pinched between the outer circumferential surface of the gear case and the inner circumferential surface of the spur gear as shown in FIGS. 16 and 17; however, a projecting portion T can be provided at the outer circumferential surface of the gear case and a recessed portion S can be provided at the inner circumferential surface of the spur gear, and the end portion of the power spring can be firmly gripped between the mated projecting portion T and recessed portion S. Thus, the connection between the spur gear and the power spring is firmly secured.

What is claimed is:

1. A seat belt retractor comprising:
    a frame having a pair of side plates which face each other and a back plate which interconnects said side plates;
    a reel shaft arranged between said side plates and having ends projecting to exterior areas of said side plates;
    power springs linked in series and provided at one exterior side of said side plates, said power springs having first and second ends, said first end being connected to one of the ends of said reel shaft adjacent thereto to energize said reel shaft in a direction of retracting a seat belt, said power springs including at least first and second power springs which have different spring constants; and
    a retracting force adjusting device for adjusting force of retracting said seat belt by partially taking up said power springs, said retracting force adjusting device including:
    a shaft actuator member mounted coaxially on said reel shaft, said first power spring being wound up on said shaft actuator member to which an inner circumferential end portion of said first power spring forming said first end of the power springs is connected;
    a first spur gear mounted coaxially on said shaft actuator member, an outer circumferential end portion of said first power spring being connected to said first spur gear;
    a second spur gear supported pivotally by said one exterior side and mating with said first spur gear;
    a rotary drive shaft mounted coaxially on said second spur gear, said second power spring being wound up on said rotary drive shaft to which an inner circumferential end portion of said second power spring forming the second end of the power springs is connected, an outer circumferential end portion of said second power spring being connected to said second spur gear so that transmission of force between said both power springs is achieved; and
    a drive unit for rotating said rotary drive shaft.

2. A seat belt retractor as set forth in claim 1 wherein said power springs are covered with a guard member.

3. A seat belt retractor as set forth in claim 1, wherein shaft energizing force generated by said power springs increases when said retracting force adjusting device takes up the power springs, and the shaft energizing force generated by said power springs decreases when said power springs are unwound.

4. A seat belt retractor comprising:
    a frame having a pair of side plates which face each other and a back plate which interconnects said side plates;
    a reel shaft arranged between said side plates and having ends projecting to exterior areas of said side plates;
    power springs linked in series and provided at one exterior side of said side plates, said power springs having first and second ends, said first end being connected to one of the ends of said reel shaft adjacent thereto to energize said reel shaft in a direction of retracting a seat belt, said power springs including at least first and second power springs which have different spring constants; and a retracting force adjusting device for adjusting force of retracting said seat belt by partially taking up said power springs, said retracting force adjusting device including:

a tape for transmission of rotation and having first and second ends;

a shaft actuator member mounted coaxially on said reel shaft, said first and second power springs being wound on said shaft actuator member and an inner circumferential end portion of said second power spring forming said first end of the power springs being connected to said shaft actuator member;

a first rotary member fitted rotatably over said shaft actuator member and having a portion for taking up said tape, said first end of said tape being wound onto the first rotary member, an outer circumferential end portion of said first power spring forming sid second end of the power springs being connected to the first rotary member;

a second rotary member fitter rotatably over said shaft actuator member, an inner circumferential end portion of said first power spring being wound on said second rotary member and an outer circumferential end portion of said second power spring being connected to said second rotary member;

a third rotary member for taking up said tape and having a rotation axis parallel to said shaft actuator member, said second end of the tape being wound onto the third rotary member; and a drive unit for rotating said third rotary member.

5. A seat belt retractor as set forth in claim 4, further comprising a limit switch to detect diameter of the tape on the third rotating member.

6. A seat belt retractor as set forth in claim 4, wherein shaft energizing force generated by said power springs increases when said retracting force adjusting device takes up the power springs, and the shaft energizing force generated by said power springs decreases when said power springs are unwound.

* * * * *